United States Patent
Tai et al.

(10) Patent No.: US 7,173,834 B2
(45) Date of Patent: Feb. 6, 2007

(54) HALF-CONTROLLED SILICON-CONTROLLED RECTIFYING SYSTEM AND METHOD THEREOF

(75) Inventors: Chui-Min Tai, Taoyuan (TW); Cheng-Te Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/102,823

(22) Filed: Apr. 11, 2005

(65) Prior Publication Data
US 2006/0158913 A1  Jul. 20, 2006

(30) Foreign Application Priority Data
Jan. 19, 2005  (TW) .............. 94101593 A

(51) Int. Cl.
H02M 7/68 (2006.01)
H02M 7/04 (2006.01)
H02M 7/155 (2006.01)
H02H 7/125 (2006.01)

(52) U.S. Cl. .............. 363/88; 363/87; 363/129; 363/54

(58) Field of Classification Search .......... 363/88, 363/87, 129, 54, 81, 44, 37
See application file for complete search history.

(56) References Cited

U.S. PATENT DOCUMENTS

| | | | | | |
|---|---|---|---|---|---|
| 3,364,412 A | * | 1/1968 | Sauter | .......... | 363/87 |
| 3,407,348 A | * | 10/1968 | Lawrence et al. | ............ | 363/10 |
| 3,551,782 A | * | 12/1970 | Maynard | ........... | 363/54 |
| 3,590,360 A | * | 6/1971 | Puckette | ........... | 363/89 |
| 3,803,476 A | * | 4/1974 | Reeve | ........... | 363/79 |
| 4,017,744 A | * | 4/1977 | Johnson | ........... | 327/172 |
| 4,063,146 A | * | 12/1977 | Oliver | ........... | 323/241 |
| 4,315,305 A | * | 2/1982 | Siemon | ........... | 363/88 |
| 4,328,459 A | * | 5/1982 | McLeod, Jr. | ........... | 323/300 |
| 4,330,817 A | * | 5/1982 | Avar et al. | ........... | 363/96 |
| 4,346,432 A | * | 8/1982 | Gurr | ........... | 363/129 |
| 4,423,477 A | * | 12/1983 | Gurr | ........... | 363/54 |
| 4,490,780 A | * | 12/1984 | Nondahl | ........... | 363/87 |
| 4,598,353 A | * | 7/1986 | Leuthen | ........... | 363/87 |
| 4,774,650 A | * | 9/1988 | Kahkipuro et al. | ........... | 363/132 |
| 4,791,545 A | * | 12/1988 | Hinckley | ........... | 363/81 |
| 5,165,049 A | * | 11/1992 | Rotman | ........... | 323/212 |
| 5,250,777 A | * | 10/1993 | Fishman | ........... | 219/619 |
| 5,574,635 A | * | 11/1996 | Philippe | ........... | 363/124 |
| 6,055,167 A | * | 4/2000 | Shamkovich et al. | ........... | 363/52 |
| 6,934,169 B2 | * | 8/2005 | Miettinen | ........... | 363/88 |
| 6,969,959 B2 | * | 11/2005 | Black et al. | ........... | 315/307 |
| 7,006,366 B2 | * | 2/2006 | Panda et al. | ........... | 363/70 |

* cited by examiner

*Primary Examiner*—Karl Easthom
*Assistant Examiner*—Harry R Behm

(57) ABSTRACT

A half-controlled silicon control rectifying system and method thereof are provided. In this case, the first detection unit detects the zero cross phase of the triphase AC in input port thereof. The second detection unit detects the voltage of the DC bus. Then the control unit controls the silicon-controlled rectifying unit by software. Therefore, the efficiency of soft actuation is achieved.

7 Claims, 2 Drawing Sheets

HALF-CONTROLLED SILICON-CONTROLLED RECTIFYING SYSTEM AND METHOD THEREOF

BACKGROUND

1. Field of the Invention

The invention relates to a half-controlled silicon-controlled rectifying system and method thereof, in particular, to a rectifying system and method applied to the electric power actuator.

2. Related Art

With the increasing popularity of various portable electronic products, the importance of power management is ever increasing. The related manufacturers are engaged and dedicated in the research and development of elements with smaller size, higher degree of integration, and higher power conversion efficiency, utilized in such portable electronic products, to increase the service life of the system and the durability of the battery.

With regard to the power management, usually the soft actuation equipment is included to restrict the actuation current, as such to reduce the impact of the system on the instantaneous actuation current caused by the power actuation. Presently, a silicon-controlled rectifier with the soft actuation equipment achieves the utility of the soft actuation by utilizing the fully-controlled silicon-controlled rectifying system having quite a few complicated hardware structures. Such equipment, as shown in FIG. 1, comprises: a silicon-controlled rectifying unit 101, a direct current (DC) bus 102, a diode unit 103, an actuation resistor unit 104 and a transformer 105. When the silicon-controlled rectifying unit 101 is driven to transmit the power, the diode unit 103 and the actuation resistor unit 104 first are actuated, and then the actuation resistor unit 104 isn't actuated until the voltage on the DC bus 102 reaches a threshold conducting voltage.

However, there are some technical problems in the structure as shown in FIG. 1. For example, when the silicon-controlled rectifying unit 101 is out of control, whether the silicon-controlled rectifying unit 101 is driven normally is not able to be determined, so that it may be damaged. Further, these structures utilized presently all belong to a hardware driving type, which lacks any proper protection and feedback control to protect the commutation angle of the silicon-controlled rectifying unit 101.

SUMMARY

In view of the foregoing, the object of the invention is to provide a half-controlled silicon-controlled rectifying system and method thereof, to solve the technical problems concerning the silicon-controlled rectifier in the prior art.

To achieve the above-mentioned objective, the invention discloses a half-controlled silicon-controlled rectifying system, comprising: a first detection unit, a silicon-controlled rectifying unit, a direct current (DC) bus, a second detection unit, and a control unit. The first detection unit has a first input port to detect the zero cross phase of the triphase alternating current (AC) inputted into the first input port. The silicon-controlled rectifying unit has a second input port to receive the triphase alternating current. The DC bus is connected to the silicon-controlled rectifying unit to receive the output of the silicon-controlled rectifying unit. The second detection unit is connected to the DC bus to detect the voltage on the DC bus. The control unit receives the outputs of the first and the second detection units, and determines whether to send a trigger signal to the silicon-controlled rectifying unit based on the detecting results of the first detection unit and the second detection unit, thereby conducting the triphase AC inputted into the second input port of the silicon-controlled rectifying unit.

According to an embodiment of the invention, the zero cross phase of the triphase AC passing the input of the system is detected by the first detection unit, the voltage on the DC bus is detected by the second detection unit, and the silicon-controlled rectifying unit is controlled by the control unit through software, thereby achieving the rectifying function.

According to the embodiment of the invention, the disclosed half-controlled silicon-controlled rectifying system and method thereof achieve the efficiency of soft actuation through a software control in cooperation with a simple hardware structure, that replaces the complicated hardware structure of the prior art. As such, not only the cost of the circuit design is reduced, but the control of the silicon-controlled rectifier is also more precisely. Further, when the commutation angle of the silicon-controlled rectifier is controlled, the voltage on the DC bus is also controlled and the voltage drop on the circuit is also compensated, thereby achieving the increase of the operation efficiency and reducing the power loss during the switching of the transistors to raise the power utilization efficiency.

BRIEF DESCRIPTION OF THE DRAWINGS

The present invention will become more fully understood from the detailed description given below, which is for illustration only and thus is not limitative of the present invention, wherein.

DETAILED DESCRIPTION OF THE INVENTION

Figure 1:
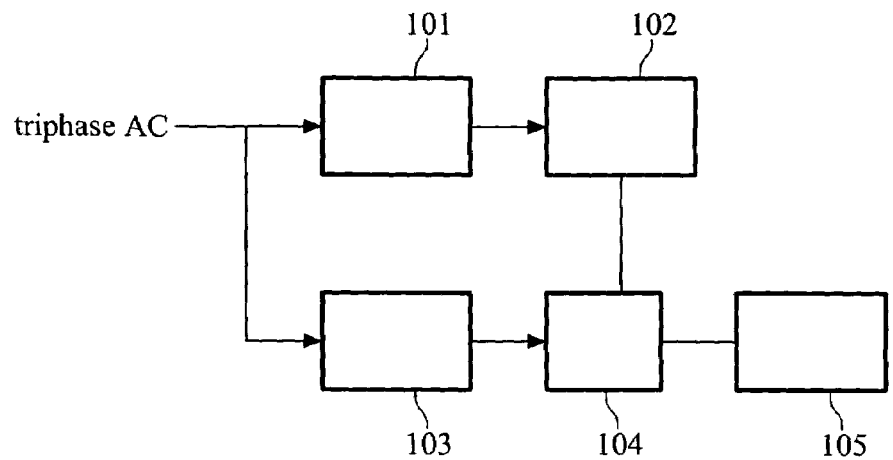
FIG. 1 is a schematic diagram shown the structure of a silicon-controlled rectifying system of the prior art.
Figure 2:
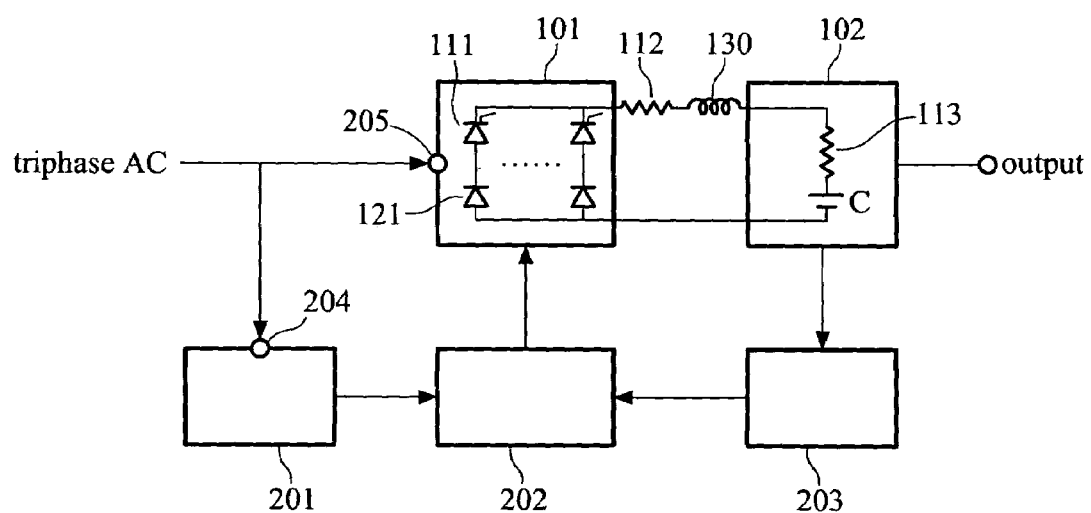
FIG. 2 is a schematic diagram shown the structure of the half-controlled silicon-controlled rectifying system according to the first embodiment of the invention.

As shown in FIG. 2, the half-controlled silicon-controlled rectifying system according to the first embodiment of the invention comprises: a first detection unit 201, a silicon-controlled rectifying unit 101, a DC bus 102 connected to the silicon-controlled rectifying unit 101, a second detection unit 203 connected to the DC bus 102, a control unit 202, a first resistor 112, and an inductor 130.

Herein, the first detection unit 201 is provided with a first input port 204, which receives the triphase AC, to detect the zero cross phase at 0 degree and 180 degrees of the triphase AC from the first input port 204 which the preference point for the phase angles 0 degrees and 180 degrees are the phases of the $1^{st}$ zero value of each sine wave of the triphase AC within one period. The silicon-controlled rectifying unit 101 includes a plurality of silicon-controlled rectifiers 111 and a plurality of diodes 121, and is provided with a second input port 205 receiving the triphase alternating current in synchronization with the first input port to determine whether to conduct the output of the triphase AC from the second input port 205. The DC bus 102 includes a charging capacitor C and a second resistor 113. The second detection unit 203 is used to detect the voltage of the charging capacitor C of the DC bus 102. The control unit 202 is used to receive the detection results from the first detection unit 201 and the second detection unit 203, and to determine whether to send a trigger signal to the silicon-controlled rectifying unit 101 depending on the detection results of the first detection unit 201 and the second detection unit 203, thereby conducting the silicon-controlled rectifying unit 101 to enable the triphase AC from the second input port 205 to be circulated.

Figure 3:
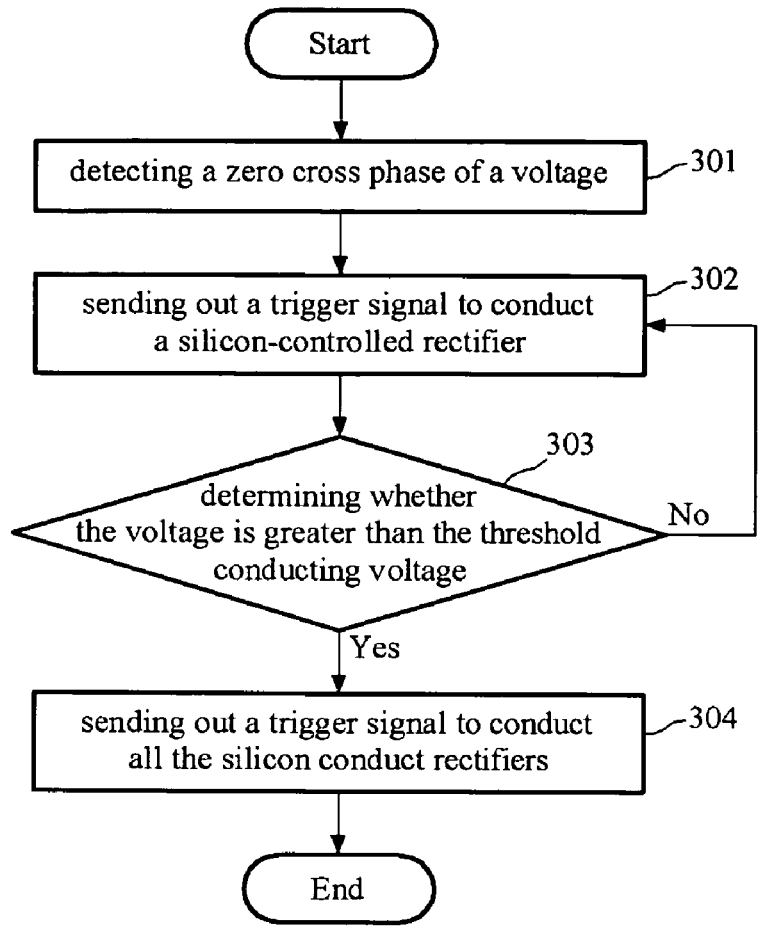
FIG. 3 is a software control flowchart of the half-controlled silicon-controlled rectifying system according to the first embodiment of the invention.

The control unit 202 executes by a software control, and the flowchart of its control process is shown in FIG. 3. When the triphase AC flows through the first input port 204, the first detection unit 201 detects the zero cross phase of the voltage of the triphase AC and sends a signal indicating the zero cross phase of the voltage into the control unit 202 (step 301), and the control unit 202 sends a trigger signal to conduct one of the silicon rectifiers 111 in the silicon-controlled rectifying unit 101 (step 302). Then the control unit 202 determines whether the detected voltage value concerning the charging capacitor C of the DC bus 102 from the second detection unit 203 is greater than a threshold conducting voltage (step 303). If the detected voltage value is greater than the threshold conducting voltage, the control unit 202 sends a trigger signal to conduct all the silicon-controlled rectifiers 111 of the silicon-controlled rectifying unit 101 (step 304). If not, the control unit 202 sends out a trigger signal to conduct a silicon rectifier 111 of the silicon-controlled rectifying unit 101 in the next time when the input triphase AC is close to the zero cross phase.

In the step 303, suppose that the detected voltage value, concerning the charging capacitor C of the DC bus 102, from the second detection unit 203 is not greater than the threshold conducting voltage. The control unit 202 sends a trigger signal to conduct one of silicon-controlled rectifier 111 of the silicon-controlled rectifying unit 101 in the next period, when the triphase AC is close to the zero cross phase. Thus, in the process of repeated determination, each of silicon rectifiers 111 of the silicon-controlled rectifying unit 101 is gradually made conductive in advance in each period, thereby prolonging the overall conduction duration of the silicon-controlled rectifying unit 101, so that the voltage of the charging capacitor C of the DC bus 102 is increased gradually. Until the voltage of the charging capacitor C of the DC bus 102 is greater than the threshold conducting voltage, the control unit 202 sends a trigger signal to conduct all the silicon-controlled rectifiers of the silicon-controlled rectifying unit 101, so that the effect of soft actuation is achieved. In addition, the zero cross phase is chosen at 0° or 180°.

Figure 4:
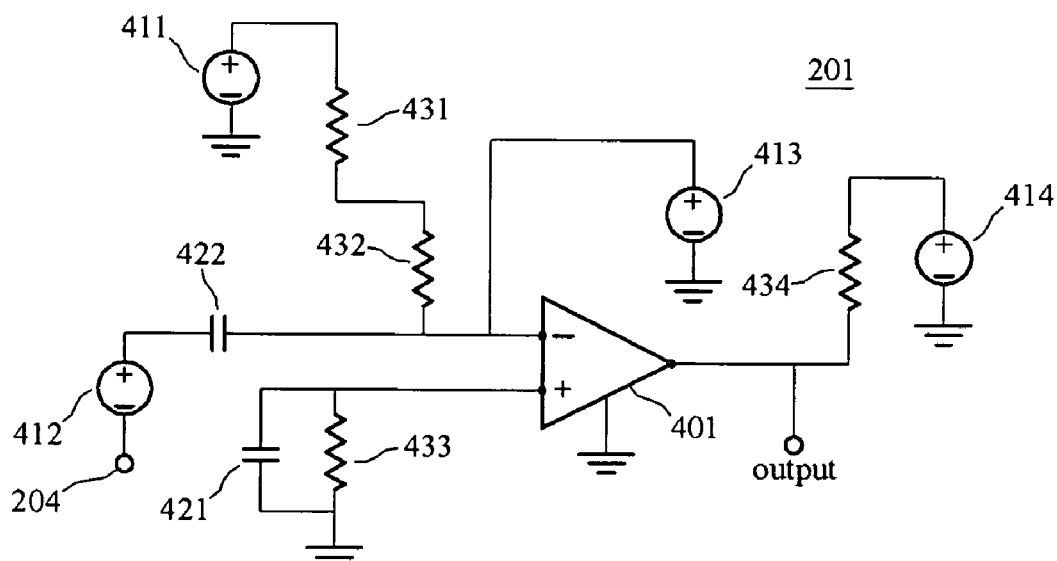
FIG. 4 is a circuit diagram of the first detection unit of the half-controlled silicon-controlled rectifying system according to the first embodiment of the invention.

Furthermore, the first detection unit 201, as shown in FIG. 4, comprises: a comparator 401, a first voltage source 411 connected to the negative input terminal of the comparator 401, a second voltage source 412 connected to the calibration terminal of the comparator 401, a third voltage source 413 connected to the negative terminal of the comparator 401, a fourth voltage source 414 connected to the output terminal of the comparator 401, a first resistor 431 connected between the comparator 401 and the first voltage source 411, a second resistor 432 connected between the comparator 401 and the first resistor 431, a third resistor 433 connected between the positive terminal of the comparator 401 and the ground, a fourth resistor 434 connected between the comparator 401 and the fourth voltage source 414, a first capacitor 421 connected between the positive terminal of the comparator 401 and the ground and connected in parallel with the third resistor 433, and a second capacitor 422 connected between the negative terminal of the comparator 401 and the second voltage source 412.

When the input terminal 402 receives the voltage of the triphase AC from the first input port 204, the voltage is compared with the predetermined voltage set in the comparator 401. While the voltage value of the received triphase AC reaches the zero cross phase, the comparator 401 outputs a signal with a high voltage level to inform the control unit 202 that the voltage of the input signal has reached the zero cross phase.

Knowing the invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A half-controlled silicon-controlled rectifying system, comprising:
   a first detection unit, which has a first input port receiving a triphase AC, for detecting a zero cross phase point of the triphase AC inputted into the first input port;
   a silicon-controlled rectifying unit, which has a second input port receiving the triphase AC, for rectifying the triphase AC into a DC current and for outputting a current;
   a DC bus, which is connected to the silicon-controlled rectifying unit and includes a charging capacitor, for receiving the current from the silicon-controlled rectifying unit and for converting the current into an electric energy and storing the electric energy in the charging capacitor;
   a second detection unit, which is connected to the DC bus, for detecting the voltage stored in the charging capacitor of the DC bus; and
   a control unit for receiving outputs of the first detection unit and the second detection unit, thereby determining whether to send a trigger signal to the silicon-controlled rectifying unit depending on the outputs of the first detection unit and the second detection unit to enable the triphase AC to flow through the second input port,
   Wherein when the triphase AC flows through the first input port, the first detection unit detects the zero cross phase of the voltage of the triphase AC and sends the trigger signal indicating the zero cross phase of the voltage into the control unit, and the control unit sends the trigger signal to conduct one of the silicon rectifiers in the silicon-controlled rectifying unit, the control unit determines whether the detected voltage value concerning the charging capacitor of the DC bus from the second detection unit is greater than a threshold conducting voltage, if the detected voltage value is greater than the threshold conducting voltage, the control unit sends a trigger signal to conduct all the silicon-controlled rectifiers of the silicon-controlled rectifying unit, if not, the control unit sends out the trigger signal to conduct a silicon rectifier of the silicon-controlled rectifying unit in the next time when the input triphase AC is close to the zero cross phase.

2. The half-controlled silicon-controlled rectifying system of claim 1, wherein the first detection unit is a trigger circuit for the zero cross phase of the voltage.

3. The half-controlled silicon-controlled rectifying system of claim 1, wherein the first detection unit detects the zero cross phase at 0 degree which the reference point for the phase angle 0 degree is the phase of the 1$^{st}$ zero value of each sine wave of the triphase AC within one period.

4. The half-controlled silicon-controlled rectifying system of claim 1, wherein the first detection unit detects the zero cross phase of 180 degrees which the reference point for the phase angle 180 degree is the phase of the 1$^{st}$ zero value of each sine wave of the triphase AC within one period.

5. The half-controlled silicon-controlled rectifying system of claim 1, wherein the silicon-controlled rectifying unit includes a plurality of silicon-controlled rectifiers and a plurality of diodes.

6. The half-controlled silicon-controlled rectifying system of claim 1, wherein the DC bus includes a charging capacitor and a second resistor.

7. The half-controlled silicon-controlled rectifying system of claim 1, wherein the detection unit comprising:
   a comparator, having a negative input terminal, a positive input terminal and an output terminal;
   a first voltage source, connected to the negative input terminal of the comparator through a first resistor and a second resistor wherein the first resistor and second resistor are connected in series;
   a second voltage source, connected to the calibration terminal of the comparator and connected to the negative input terminal of the comparative through a second capacitor;
   a third voltage source, connected to the negative input terminal of the comparator;
   a fourth voltage source, connected to the output terminal of the comparator through a fourth resistor;
   a third resistor, connected between the positive input terminal of the comparator and the ground; and
   a first resistor, connected between the positive input terminal of the comparator and the ground, and connected in parallel with the third resistor.

* * * * *